(No Model.) 3 Sheets—Sheet 1.

J. M. BLAKE.
DUMPING WAGON.

No. 566,492. Patented Aug. 25, 1896.

Witnesses:
O. E. Hoddick
F. P. Kirsten

Inventor
Joseph M. Blake
By
W. T. Miller
Attorney

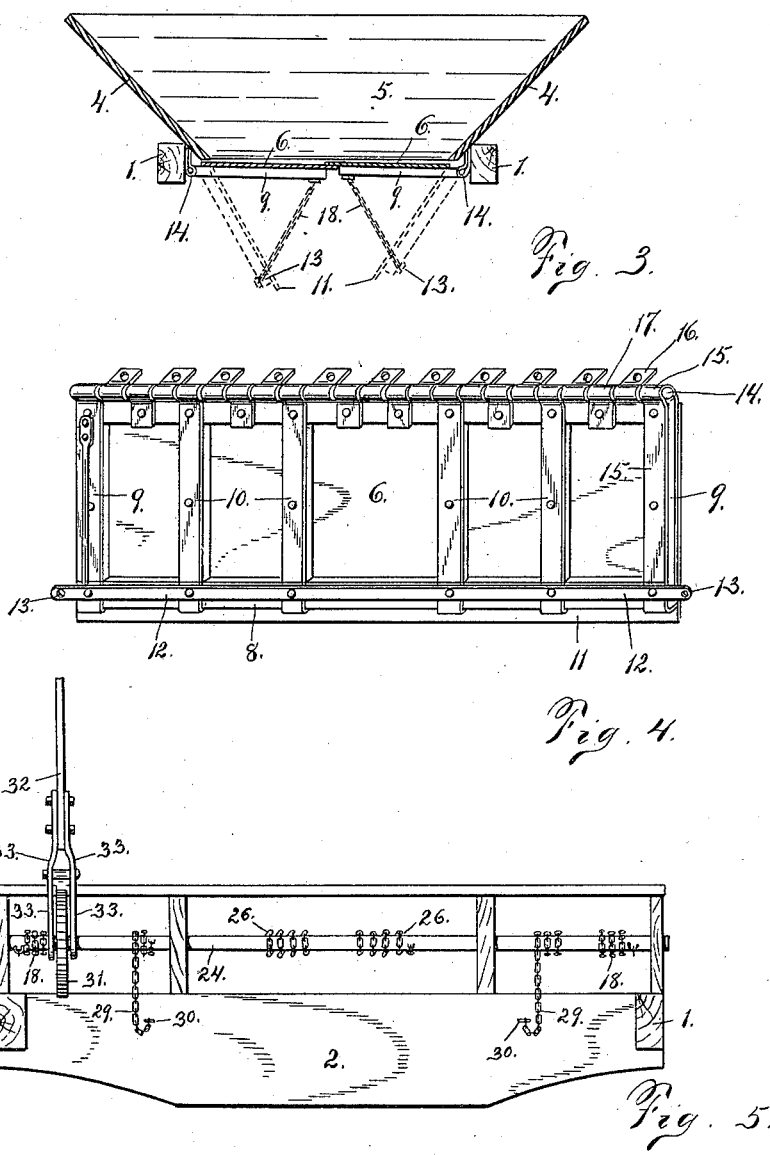

(No Model.) 3 Sheets—Sheet 3.
J. M. BLAKE.
DUMPING WAGON.
No. 566,492. Patented Aug. 25, 1896.
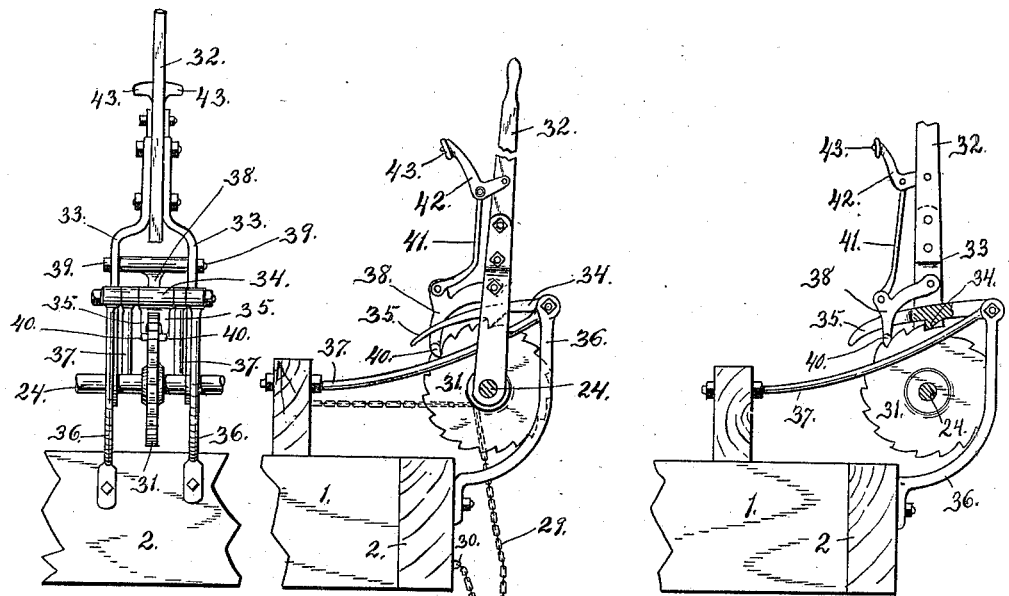
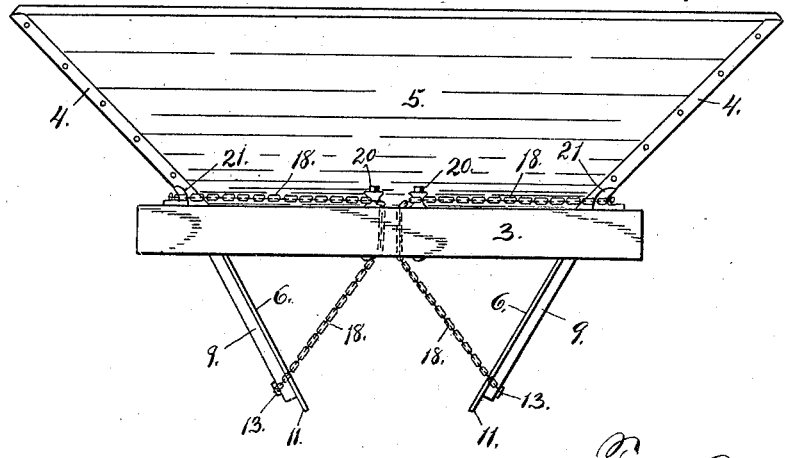
Witnesses:
O. E. Hoddick
J. P. Kersten
Inventor:
Joseph M. Blake
By W. T. Miller
Attorney

UNITED STATES PATENT OFFICE.

JOSEPH M. BLAKE, OF BUFFALO, NEW YORK.

DUMPING-WAGON.

SPECIFICATION forming part of Letters Patent No. 566,492, dated August 25, 1896.

Application filed February 23, 1894. Serial No. 501,117. (No model.)

*To all whom it may concern:*

Be it known that I, JOSEPH M. BLAKE, a citizen of the United States, residing at Buffalo, in the county of Erie and State of New York, have invented certain new and useful Improvements in Dumping-Wagons; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to that class of dumping-wagons in which the load is dropped out at the bottom of the wagon, its object being to so locate and arrange the mechanism which releases the load and restores the bottom to its closed position to hold the next load that it can be entirely operated and controlled at the front of the wagon by the driver in his position upon the seat.

To that end my invention consists, specifically, of certain details of construction, all of which will be more particularly hereinafter described.

I will now proceed to minutely describe the manner in which I have carried out my invention and then claim what I believe to be novel.

Figure 1:
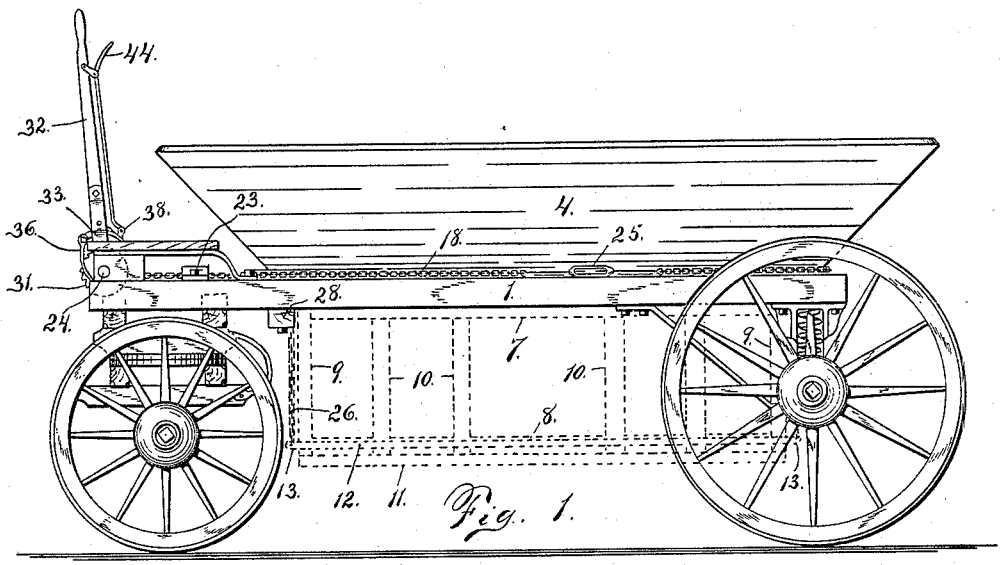
Figure 2:
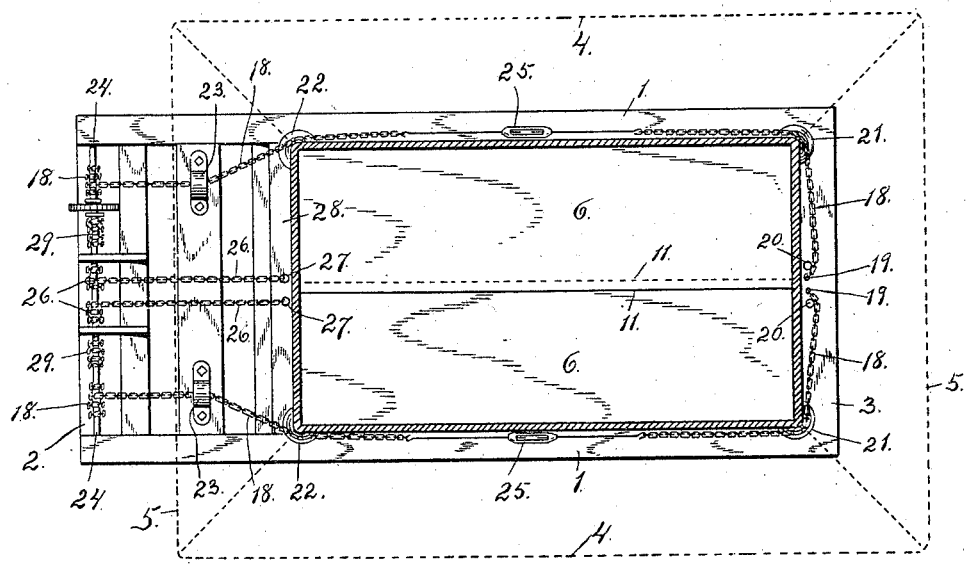

In the drawings, Figure 1 is a side elevation of my improved dumping-wagon. Fig. 2 is a top plan view of the same with the operating-lever and side walls of the box removed. Fig. 3 is a vertical transverse section of the box, showing the box-bottom sections closed in full lines and open in dotted lines. Fig. 4 is a detached detail view of one of the box-bottom sections, illustrating the form of hinge employed. Fig. 5 is a similar view, in front elevation, of the winding-shaft and operating-lever. Fig. 6 is a rear view of the wagon-box, showing the box-bottom sections in open position; and Figs. 7, 8, and 9 are respectively detached front, side, and sectional elevations of the operating mechanism.

Referring to the drawings, 1 1 are the side sills, 2 the front sill, and 3 the rear sill, of the wagon-frame, suitably mounted upon its running-gear and carrying above the bottom level of the sills a box secured thereto with outwardly inclined or flaring side walls 4 4 and end walls 5 5, made, preferably, of sheet-steel of, say, three-sixteenths of an inch in thickness.

6 6 are the longitudinal box-bottom sections of equal dimensions, the bodies of which being constructed also of three-sixteenths sheet-steel. On the under sides of these sections are secured strengthening-frames or trusses of wood, consisting of the longitudinal side pieces 7 and 8, end cross-pieces 9 9, and intermediate cross-pieces 10. The longitudinal cross-pieces 7 and end pieces 9 9 are flush with the edges of the steel sections 6 6, but the longitudinal side pieces 8 are placed a short distance back of the contiguous edges of the sections 6, forming narrow extensions 11, which overlap one upon the other when the sections are in closed position, thus forming a central tight joint, as shown in Fig. 3, which effectually prevents any spilling of the contents of the box.

12 is a metal strip secured along the side pieces 8, to the projecting ends 13 of which the flexible connections are to be secured. The box-bottom sections 6 6 are hinged to the side sills 11 as follows, (see Fig. 4:) A metal rod 14 extends the entire length of the longitudinal side pieces 7. Starting at the right-hand end of Fig. 4, the first leaf 15 of the hinge has one end carried loosely around the rod 14 and is extended across the end cross-piece 9 its entire length, being secured thereto and acting as a truss or strengthening-piece. The second leaf 16 of the hinge has one end carried loosely around the rod 14, its other end being secured to the side sill 1. The next leaf 17 is secured to the cross-piece 7, extending only across its width. The succeeding leaves are in the same manner secured alternately to the sill 1 and to the side piece 7, and whenever a leaf comes opposite one of the intermediate cross-pieces 10 it is extended down its entire length and secured thereto. In this manner a continuous tight hinge or joint, entirely devoid of square shoulders or projections, is formed, making it impossible for any portion of the load to find a lodging-place as the box-bottom sections are moved up and down to their closed and open positions, thus insuring at all times a free and unhampered action of these hinges. Again, the end edges of the steel box-bottom sections, in their upward closing movement, have a shearing contact with the lower edges of the steel front and rear walls 5 of the box, which has the positive effect of instantly clearing away any interfering particles which may have remained after the load has been dumped. The rear free corners of the box-bottom sections have chains 18 secured thereto at the projecting ends 13 13 of the strips 12. These chains 18 pass up through separate holes 19 19 in the rear sill 3, are carried around friction-posts 20 20, along the top of the sill, and around the rear corner friction-plates 21 21, thence along the side walls 4 4 of the box to and around the front corner friction-plates 22 22, and after passing through the friction-loops 23 23 have their ends secured to the winding-shaft 24.

25 25 are turnbuckles interposed in the length of the chains on either side for the purpose of adjusting the lengths of the chains in order that one projecting edge, 11, of the box-bottom sections will clear the other as they come together, permitting them to lap in closed position, as clearly shown in Fig. 3. To the projecting end 13 of the strips 12 at the front free corners of the box-bottom sections are secured the chains 26 26, which pass up through holes 27 27 in the cross-piece 28, and thence to the winding-shaft 24, where their ends are secured.

29 29 are short check-chains, their lower ends being secured to eyes 30 on the front face of the sill 2 and their upper ends to the winding-shaft 24, their function being to limit the downward swing of the hinged box-bottom sections. This is accomplished as follows: When the chains connected to the box-bottom sections are wound around the shaft 24 in closing the bottom, the short chains are unwound, and when the box-bottom sections are released by the unwinding of their chains, then the short check-chains 29 are wound around the shaft until taut, which stops its revolution and prevents the box-bottom sections from swinging far enough to strike the wheels. Rigidly secured to the winding-shaft 24 at one side is the ratchet-wheel 31, and 32 is a lever having a fork consisting of two arms 33 33, passing down on each side of the ratchet-wheel 31 and loosely pivoted on the winding-shaft 24. A locking and retaining pawl 34, with outer bifurcated end 35, is pivoted at the junction of the braces 36 36 and 37 37 and extends rearwardly between the arms 33 33 of the lever 32. The actuating-pawl 38 is pivoted in the arms 33 33 of lever 32, as at 39 39, its lower end engaging and passing down through the bifurcated end 35 of the pawl 34, and provided at its extremity with the side wings 40 40. Hinged to the pawl 38 is the rod 41, its upper end being hinged to the short lever 42, pivoted to the long lever 32 and provided at its outer end with the cross-piece 43 (see Figs. 7, 8, and 9) for engagement with the driver's foot, or a longer thumb-lever 44 (see Fig. 1) could be employed.

In operation the hinged box-bottom sections are raised to their closed positions by reciprocating the lever 32, which causes the actuating-pawl 38 to engage with the teeth of the ratchet-wheel 31 and rotate it and with it the winding-shaft 24, upon which it is rigidly secured, the retaining-pawl 34 by its weight locking and holding the ratchet-wheel each time that it is advanced by the pawl 38. As the winding-shaft 24 rotates the chains 18 18 and 26 26, secured to the box-bottom sections, are wound around such shaft, which serves to lift said sections to their closed positions, where they are held by the retaining-pawl 34 engaging with the ratchet-wheel 31. When it is desired to dump the load in the box, it is only necessary for the driver with his foot to push in the cross-piece 43, which raises the actuating-pawl 38 until its wings 40 engage with and raise the bifurcated end 36 of the retaining-pawl 34, thus releasing its hold upon the ratchet-wheel 31, which permits the shaft 24 to turn, unwinding the connecting-chains 18 18 and 26 26 and until stopped by the short check-chains 29. By this time the box-bottom sections have swung down to their open positions and the load is free to fall to the ground. As will be seen, the closing of the box-bottom sections and the releasing of the same to dump the load are both under complete control of the driver from his position upon the seat, and even while holding the reins to control the horses, if found necessary, he can dump the load with a simple push of his foot.

Another advantage of my improved construction is that all the connections between the box-bottom sections and the operative mechanism are outside of the box and therefore perfectly free from contact with the contents of the box.

I claim—

1. In a dumping-wagon, the combination with the running-gear supporting the side sills connected by front and rear sills, the stationary wagon sides and ends, and the box-bottom sections hinged at their outer edges to the side sills; of the rock-shaft journaled across the front sill, the ratchet-wheel fast thereon, braces rising from the sill, a retaining-pawl pivoted to said braces with its operative end engaging said wheel, a bifurcated lever journaled on the shaft astride the wheel, an actuating-pawl pivoted to the lever and engaging said wheel, a thumb-lever for said pawl, flexible connections between the box-bottom sections and said shaft, and a check-chain wound oppositely on the shaft and connected at its other end with the front sill, as and for the purpose set forth.

2. In a dumping-wagon, the combination with the running-gear supporting the side sills connected by front and rear sills, the stationary wagon sides and ends, and the box-bottom sections hinged at their outer edges to the side sills; of the rock-shaft journaled across the front sill, the ratchet-wheel fast thereon, a retaining-pawl having its operative end engaging said wheel and its free end bifurcated, a forked lever journaled on said shaft astride the wheel and astride said pawl, an actuating-pawl pivoted to said lever with its tip passing through the bifurcated end of said retaining-pawl and engaging the wheel, lateral wings at the free end of this pawl standing under the bifurcated end of the retaining-pawl, means for tripping the actuating-pawl, and flexible connections between the free edges of the box-bottom sections and said shaft, as and for the purpose set forth.

In testimony whereof I have signed my name to this specification in the presence of two subscribing witnesses.

JOSEPH M. BLAKE.

Witnesses:
FANNY BLAKE CHASE,
W. T. MILLER.